Nov. 8, 1949  E. E. ROHLF  2,487,183
WELDING HOOD
Filed Feb. 12, 1946  3 Sheets-Sheet 1

Inventor
EARL E. ROHLF
By Clarence A. O'Brien
and Harvey B. Jacobson
Attorneys

Nov. 8, 1949     E. E. ROHLF     2,487,183
WELDING HOOD

Filed Feb. 12, 1946     3 Sheets—Sheet 2

Inventor

EARL E. ROHLF

By *Clarence A. O'Brien and Harvey B. Jacobson*
Attorneys

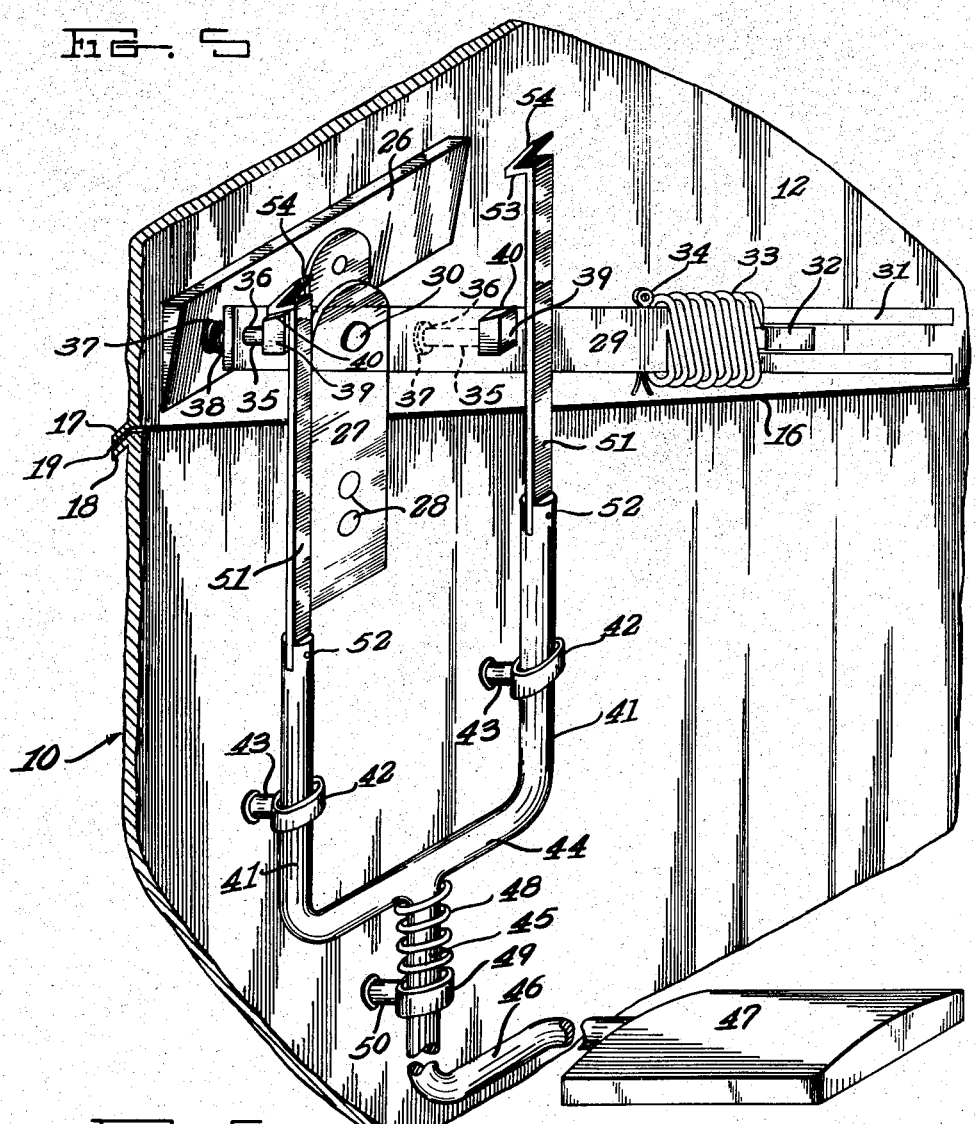
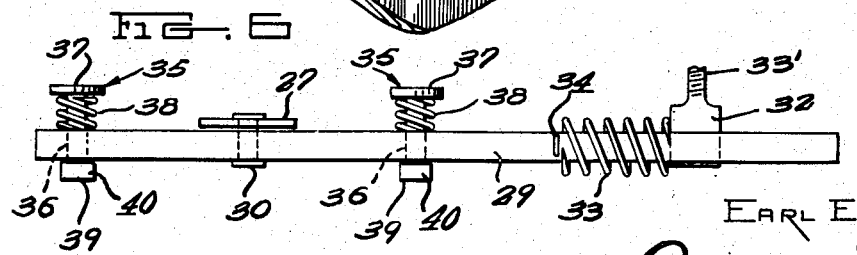

Patented Nov. 8, 1949

2,487,183

UNITED STATES PATENT OFFICE 2,487,183

WELDING HOOD

Earl E. Rohlf, Milwaukie, Oreg.

Application February 12, 1946, Serial No. 647,101

7 Claims. (Cl. 2—8)

My invention relates to welding hoods, and the object thereof is to provide a novel welding hood in which the top portion of the hood opens and closes and carries a colored lens through which the welder may sight the work being operated upon so as to protect the user's eyes, and which when raised, permits vision of the work through a flexible shield and protection while knocking off slag when the hood is in an open position, the opening and closing of the top section of the hood being operated by the chin of the user without employing the hands, thereby permitting the welding operator the full use of both hands at all times.

Another object of the invention is to provide a welding hood which opens and closes by the use of the movement of the wearer's chin as the mechanical motivating power, thereby freeing the hands, and which permits greater accuracy in welding as the operator may open his hood just a very little and take a peek at his work and then permit the hood to close, such opening and closing action being fast, so as to speed up the work.

Another and important object of the invention is to provide a novel operating mechanism for raising and lowering the hinged top section of the hood to open and close the hood and which upon release of the chin from the operating chin rest thereof after opening the hood cover, will remain open, but upon a downward thrust or nod of the head, will cause the hood cover top section to close, thereby allowing the operator to view his work, talk or breathe freely all without taking his hands from his work.

Other objects and advantages reside in the details of construction and operation as more fully hereinafter described and claimed, reference being had to the accompanying drawings forming part hereof, wherein like numerals refer to like parts throughout, and in which:

Figure 5 is an enlarged fragmentary sectional perspective view of the hood operating means, and Figure 6 is an enlarged fragmentary view of the hood operating lever.

Figure 1:
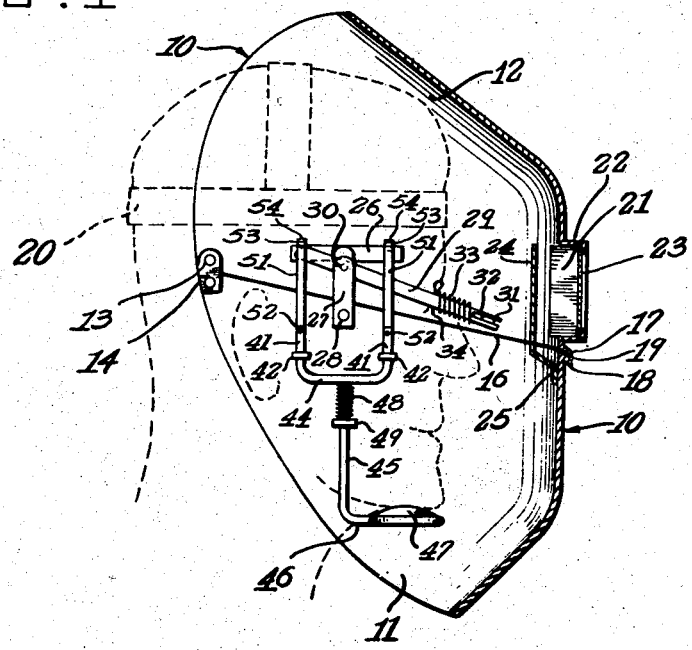
Figure 1 is a side elevation of a welder's hood constructed in accordance with the invention, the hood being shown in a closed position.

Referring to the drawings in detail, in which like reference characters designate corresponding parts throughout the several views, a welder's hood 10 is shown having a lower section 11 and an upper section 12 pivoted or hinged as at 13 to the rear edge of the lower section by plate 14, which may be clamped in position at the pivots by wing nuts 15 at each side of the hood. The sections are divided on a forwardly inclined joint or line 16 having open and overlapping flanges 17 and 18 on the top and bottom sections to provide a lap joint, thus to prevent the entry of sparks, with an interposed thin rubber gasket 19 therebetween. The hood is adapted to be held on the head of the wearer by means of a head band 20 of suitable character. At the front, the upper movable hinge section 12 is provided with a sight opening 21 produced by a flange 22 extending forwardly and provided with a colored sight lens 23 of suitable character to protect the eyes of the welder from the light of the welding torch. Immediately in rear of the sight opening 21 and lens 23, is a flexible transparent guard or eye shield 24 set in spaced relation to the opening and having an offset portion at the bottom attached to the stationary lower section of the hood as indicated at 25, so that when the hood is open, the eyes of the wearer will be protected, especially while knocking off slag from the work, when the hood is in an open position.

In order to actuate the hinged top section or cover of the hood, a horizontal downwardly tapered wedge or cam plate 26 is secured within one side of the hood, as by means of a pair of depending connected strips or plates 27 which are in turn secured to the stationary lower section of the hood as indicated at 28, to project above the top inclined edge thereof, as shown in the drawings. A lever 29 is pivoted at 30 to the plates 27 spaced from its rear end, and has a slot 31 in its forward end to slidably engage a pin 32 having its shank 33' threaded or otherwise formed and bolted or secured through the side of the upper section of the hood by means of a nut or other suitable means. A spring 33 is provided on the lever 29 between the pin 32 and a cotter pin 34 to exert pressure against the pin tending to raise the top section of the hood and cushion the movement thereon, especially the closing. The lever 29 carries a pair of pins 35 which are movable through holes 36 in the lever on each side and equidistantly from the pivot 30 thereof, said pins having enlarged heads 37 at their outer ends against which coil springs 38 act between the lever and said heads to normally retract the pins and their forward substantially rectangular enlargements or stops 39 provided on the inner ends thereof and having inclined top faces 40 sloping outwardly. In this way, when the lever is in a raised position, the pin at the inner end will be forced outwardly by engagement of the head 37 with the wedge or camming plate 26 and released when moved downwardly toward the tapered or thin edge of the cam, whereas the other pin 35 will be retracted beneath the cam but projected upon moving upwardly with the forward arm or end of the lever.

A U-shaped member or yoke 41 is slidably mounted in guides 42 having their shanks 43 secured through the side of the hood and suitably clamped to guide the fork or bifurcated member 41 in spaced relation to said side. The connecting portion 44 of the yoke has a central depending stem 45 bent forwardly at its lower end as indicated at 46 and then inwardly to carry a chin rest and operating plate 47 which extends beneath the chin of the wearer when the hood is in position and is adapted to be released and depressed by the chin in use. A spring 48 is mounted on the stem 45 between the bottom connecting or bight portion 44 and a guide 49 having a shank 50 secured to the side of the hood in the same manner as the guides 42 so that the spring exerts upward tension against the yoke to raise the latter and cushion the downward movement thereof. The upper ends of the legs of the yoke 41 carry flat narrow spring steel strips 51 which may be secured as at 52 in slotted or bifurcated upper ends of the legs of the yoke 41 and are formed with catches at their upper ends including outwardly extending portions or shoulders 53 and outwardly inclined upper portions 54 set therefrom over said portions 53 to cooperatively engage with the blocks or heads 39 of the pins 35.

Figure 2:
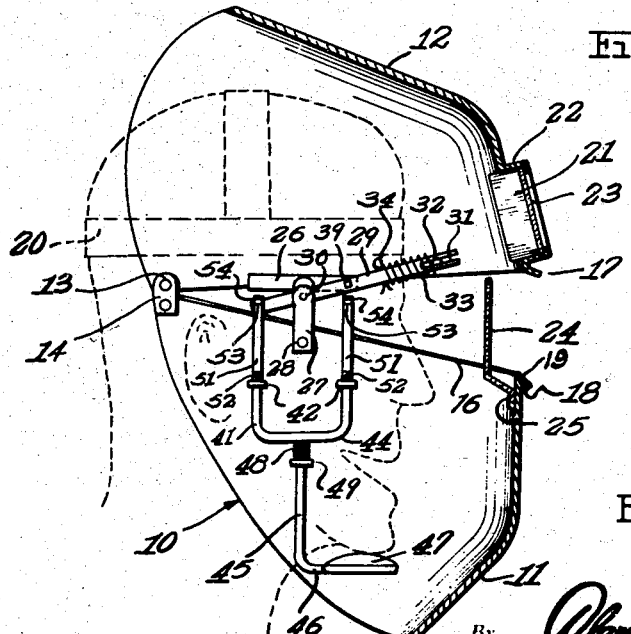
Figure 2 is a view similar to Figure 1 but showing the hood in an open position.
Figure 3:
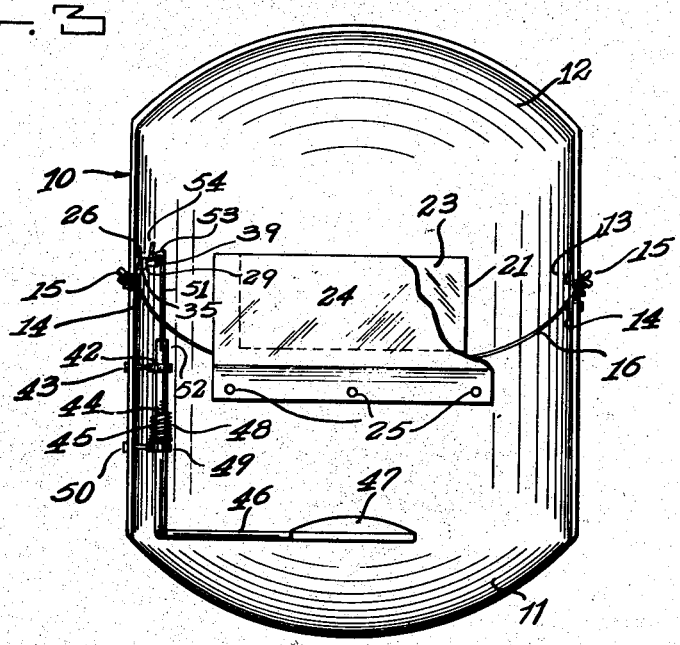
Figure 3 is a rear elevation of the hood.
Figure 4:
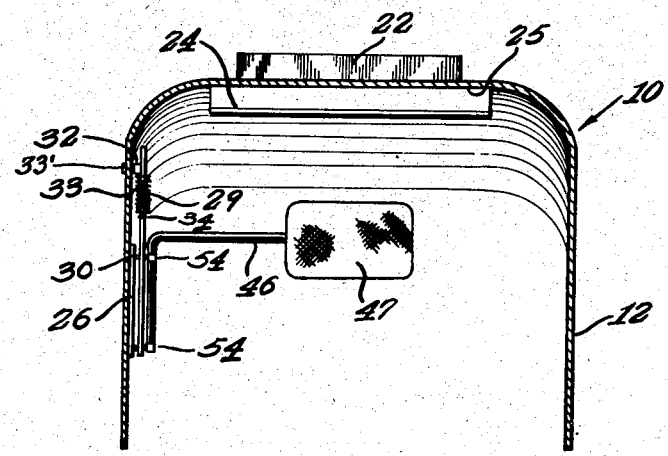
Figure 4 is a horzontal sectional view looking downwardly toward the chin operating plate.

Thus, when the device is in use, as shown in Figures 1 and 2, the chin of the wearer will engage the plate 47, and in the normal position, the lever 29 will be inclined forwardly and downwardly when the hood is closed and the upper section 12 is in a lowered position to dispose the sight opening and lens in front of the wearer's eyes, the chin being released from the operating plate 47. In this position, the catch at the upper end on one of the spring strips 51 will engage over the projecting head or block 39 of its pin 35, that is, the one at the rear end of the lever 29 as shown in Figure 5 of the drawings, with a snap action, so that the other catch will be released and the pin and head 39 thereof projected rearwardly because it is below the cam or wedge plate 26. In other words, the pin engaged by the catch will be projected forwardly by engagement with the wedge plate or cam 26 at the rear or inner end of the lever 29 and the spring 33 will be compressed against the key or stop 34. Therefore, upon downward movement of the chin as in opening the mouth, to exert pressure on the plate 47, the latter together with the yoke 41 will move downwardly to compress the spring 48 and pull the lever 29 downwardly at its rear arm or end as shown in Figure 2 of the drawings, thus raising the top section of the hood on its pivot 13. This will open the hinged upper section 12 forming the cover of the hood at the inclined joint 16 therebetween, so as to raise the sight opening 21 and lens 23 above the welder's eyes, so that vision of the welding job in connection with the work, may be permitted. In this position, the slag may be knocked from the work and protected by the flexible shield 24, which may be of isinglass or other suitable fireproof material to prevent sparks from injuring the wearer's eyes.

In the latter position, the spring 33 will be stretched or expanded as shown in Figure 2 of the drawings, the engagement of the slotted end of the lever 29 with the pin 32 causing the opening of the top section of the hood without the use of the hands, and by the lever 29 moving upwardly over the dead center, assisted by the pressure of the spring 33 against the pin 32, holding the hood cover open without the operator holding his chin in contact with the plate 47 thereby leaving the hands both free to use at all times. This allows the operator to view his work, talk to other persons or breathe fresh air freely while relieving pressure on the chin and mouth. When it is desired to close the top section of the hood, with the pressure on the chin plate 47 released, thus causing the hood to close, assisted by the spring 33 after the lever 29 moves downwardly over the dead center and the spring 48. In the upper position, the other pin 35 will be projected by engagement with the cam or wedge plate 26 while the previously engaged pin will be released and retracted from the catch 53. The inclined upper portion 54 facilitates engagement or passing of the catch beyond the head or block 39 and the other catch will engage the projected pin to facilitate the downward movement, or to raise the lever, so that each time the lever is pushed down by the chin, the lever is moved by contact of a catch with one of the retractable pins which is protruding when in contact with the cam or wedge bar 26 while the lever is in an upward position. Thus, the adjusting wedge or cam plate will depress the pin and cause it to protrude, in either case, when in a raised position and each time the chin is released, the operating yoke will be raised and the catches will jump over the protruding pin and catch on the same for the downward movement thus pulling the lever downward to close the hood on a downward travel of the yoke when depressed. Thus, the hood or top section thereof is opened or closed by each downward and release movement of the chin, thereby freeing both hands for use in connection with the work while permitting convenient opening and closing of the hood as desired. Also, the opening and closing of the hood is fast, the action being such that it may be controlled while permitting full use of both hands at all times and permitting greater accuracy in welding as the operator may open the hood just a very little, take a peek at his work and close the hood cover easily, almost without effort, assisted by gravity from the weight thereof. It is also to be understood that the operating mechanism for the cover 12 and connection to the pressure plate 47 operated by the chin of the wearer, may be duplicated at both sides of the hood without altering the principles of the invention.

In view of the foregoing description taken in conjunction with the accompanying drawings it is believed that a clear understanding of the construction, operation and advantages of the device will be quite apparent to those skilled in this art. A more detailed description is accordingly deemed unnecessary.

What I claim is:

1. A welder's hood comprising a lower section and an upper section hinged thereto, said hood having a sight opening with a lens, a protecting transparent shield carried by the lower section in spaced relation to the opening and sight lens, and means to open the hood section at the top and permit closing thereof by pressure from the chin of the wearer and release thereof.

2. A welder's hood comprising upper and lower sections hinged at the rear and sides thereof and parted on an inclined line from said pivot toward the front, with a protective joint, a tapered cam plate secured to a side of the hood lower section, a lever pivoted thereto having sliding connection with the upper section and extending on opposite sides of the pivot, a yoke slidable in the lower section and having a chin pressure plate depending therefrom resiliently held upwardly and catches on the yoke adapted to move up and down with the yoke, and means on the lever for engagement with alternate catches in cooperation with said cam plate to cause alternate engagement of the catches with the lever to swing the same alternately downwardly and upwardly and by reason of its connection with the hinged upper section of the hood to open and close the latter.

3. A welder's hood comprising a hood having upper and lower sections, the upper section being hinged to the lower section and having a sight opening and a lens to protect the eyes of the wearer, a protective joint between the sections inclined downwardly below the wearer's eyes, camming means having means secured near the top of the lower section at the inside including a downwardly tapered cam plate extending horizontally above the upper edge of the lower section, a lever pivoted in spaced relation to its rear end below said plate and having a slotted forward end, a pin on the upper section engaging said slot, a spring between said pin and a stop on the lever in rear thereof, a yoke slidably mounted at the side of the hood's lower section and having spring means to hold the same downwardly, the yoke having a laterally extending chin engaging plate at the bottom disposed in a horizontal position to be depressed by the chin of the welder, spring strips secured to the upper ends of the yoke and having laterally extending catches with upper inclined portions sloping toward the side and forming shoulders thereebeneath, pins slidably mounted in the lever at opposite sides of the pivot thereof and spring-held retracted outwardly, said pins having heads to engage the cam plate and project the pins, the forward ends of the pins having enlargements with inclined surfaces for engagement by the catches and said spring strips adapted to flex past the catches over said enlargements, whereby downward movement of the yoke when the plate thereof is depressed by the chin will cause the catch above the lever to pull the inner end of the lever downwardly and raise the forward end thereof to open the upper section of the hood and upon release of said pressure, to permit closing of the upper section of the hood against the lower section.

4. A welder's hood comprising a lower section and an upper section hinged thereto, said hood having a sight opening with a lens, a shield carried by the lower section and extending above the same in rear of the sight opening and lens when the upper section is closed, and means within the hood to raise the upper section by the chin of the wearer.

5. A welder's hood comprising upper and lower sections hinged at the rear and sides thereof and parted on an inclined line from said pivot toward the front, a seal at the joint, a tapered cam plate secured to a side of the hood lower section, a lever pivoted thereto having sliding connection with the upper section and extending on opposite sides of the pivot, a yoke slidable in the lower section and having a chin pressure plate depending therefrom resiliently held upwardly, catches on the yoke adapted to move up and down with the yoke, and means on the lever and engageable with the cam plate for actuation thereby into operative position for alternate engagement with the catches to cause engagement of the catches with the lever one at a time upon alternate actuation of the lever to swing the latter downwardly and upwardly alternately.

6. A welder's hood comprising a lower section and an upper section hinged thereto to move up and down to open and closed positions respectively, said upper hood section having a sight opening with a lens stationary therewith near its lower edge, a stationary shield carried by the lower section in rear of the sight opening and lens when the upper section is down and closed, and means to open the hood section at the top to raise said sight opening and lens above the shield and permit closing of the upper section.

7. A welder's hood comprising a lower section and an upper section hinged thereto to move up and down to open and closed positions respectively, said upper hood section having a sight opening with a lens stationary therewith near its lower edge, a stationary shield carried by the lower section near its top edge and extending upwardly from the lower section in rear of the sight opening and lens when the upper section is down and closed, and means to open the hood section at the top to raise said sight opening and lens above the shield and permit closing of the upper section by pressure of the chin of the wearer, said means having means coacting therewith to raise and lower the upper section upon alternate application of the chin pressure.

EARL E. ROHLF.

REFERENCES CITED

The following references are of record in the file of this patent:

UNITED STATES PATENTS

| Number | Name | Date |
|---|---|---|
| 1,587,893 | Bowers | June 8, 1926 |
| 2,190,074 | Locher | Feb. 13, 1940 |
| 2,352,007 | Rickert | June 20, 1944 |
| 2,384,798 | Conway | Sept. 18, 1945 |
| 2,419,649 | Lieg | Apr. 29, 1947 |